(12) United States Patent
Nagasaki

(10) Patent No.: US 6,948,422 B1
(45) Date of Patent: Sep. 27, 2005

(54) SOUP SUPPLYING APPARATUS

(75) Inventor: Tadashi Nagasaki, Tokyo (JP)

(73) Assignee: Fuji Electric Retail Systems Co., Ltd., Tokyo (JP)

( * ) Notice: Subject to any disclaimer, the term of this patent is extended or adjusted under 35 U.S.C. 154(b) by 0 days.

(21) Appl. No.: 10/929,834

(22) Filed: Aug. 30, 2004

(30) Foreign Application Priority Data

Mar. 8, 2004 (JP) .............................. P2000-063717

(51) Int. Cl.[7] .............................. A23L 1/00; A23L 1/39; A23L 1/40
(52) U.S. Cl. .............................. 99/348; 99/352; 99/357; 99/483
(58) Field of Search .................. 99/331–334, 342–344, 99/352–355, 357, 467, 468, 348, 473, 483; 221/82, 101, 203, 150 A, 150 HC; 222/1, 222/105, 135, 263, 144.5, 146.5, 214, 146.1, 222/215, 333, 129.1, 94, 129.2, 318, 240, 222/494, 334, 338, 90, 74, 93; 426/589, 578, 426/661; 366/186, 279

(56) References Cited

U.S. PATENT DOCUMENTS

| | | | | |
|---|---|---|---|---|
| 3,185,348 A | * | 5/1965 | Pollak et al. ................. 222/95 |
| 3,340,790 A | * | 9/1967 | Simjian ........................ 99/352 |
| 4,189,071 A | * | 2/1980 | West ....................... 222/189.11 |
| 4,357,861 A | * | 11/1982 | Di Girolamo .............. 99/323.3 |
| 4,359,935 A | * | 11/1982 | Murray ........................ 99/331 |
| 4,544,085 A | * | 10/1985 | Frazer ..................... 222/146.4 |
| 4,671,966 A | * | 6/1987 | Giddey et al. ............. 426/589 |
| 4,748,902 A | * | 6/1988 | Maurantonio ............... 99/326 |
| 4,993,593 A | * | 2/1991 | Fabiano et al. ............... 222/1 |
| 5,897,020 A | * | 4/1999 | Liu ............................ 220/735 |
| 6,006,657 A | * | 12/1999 | Ikuta ........................... 99/331 |
| 6,152,020 A | * | 11/2000 | Ikuta ........................... 99/352 |
| 6,703,063 B2 | * | 3/2004 | Takatsu ..................... 426/575 |

FOREIGN PATENT DOCUMENTS

JP 3449554 7/2003

* cited by examiner

Primary Examiner—Timothy F. Simone
(74) Attorney, Agent, or Firm—Pearne & Gordon LLP

(57) ABSTRACT

A soup supplying apparatus includes a vessel 5 for accommodating a soup, a funnel member 40 arranged within the vessel 5 and rotatively moving to the outside of the vessel 5 through an opening 5a, a ladling member 11 for ladling the soup within the vessel 5, a linkage mechanism 8 provided with the ladling member 11 at its one end, a linkage supporting portion 6 for rotatably supporting the linkage mechanism 8 within the vessel 5 and a driving device 26 for rotatively moving the linkage mechanism 8.

5 Claims, 3 Drawing Sheets

SOUP SUPPLYING APPARATUS

BACKGROUND OF THE INVENTION

1. Field of the Invention

The present invention relates to a soup supplying apparatus for supplying customers with a prescribed sub-divided quantity of soup such as stew, soup, curry and miso soup accommodated in a vessel.

2. Description of the Related Art

Such a previously known soup supplying apparatus is described in Japanese Patent No. 3449554. This soup supplying apparatus is one in which sub-divided predetermined quantities of soup including substances and accommodated in the vessel are distributed to a plateware. The soup supplying apparatus includes a vessel having an opening, for accommodating a soup; an axis which is rotated by a prescribed driving force; an expandable linkage mechanism attached to the axis which rotates in the vessel; a ladle attached to a tip of the linkage mechanism and having a ladle-out mouth on the opening side of the vessel; and a ladle leaning means for leaning the ladle when the ladle reaches the opening of the vessel in synchronization with the rotation of the axis. In this apparatus, when the ladle in the vessel containing the soup rotates toward the side of the opening in synchronization with the axis, the soup is accommodated in the ladle. Further, when the ladle reaches the opening of the vessel, the ladle is leaned by the ladle leaning means so that the soup within the ladle is supplied into the plateware. In this way, subdivided quantities of soup are given to customers.

Further, this soup supplying apparatus is designed so that an operator can directly touch the mechanism for ladling the soup accommodated in the vessel using the ladle, the mechanism such as the vessel containing the soup, ladle, linkage mechanism, on which the soup is applied. Therefore, these components can be cleaned relatively easily. Further, the ladle of the apparatus incorporates a net-like separating means for passing the soup liquid when accommodating the soup thereby separating the substances and the soup liquid at a prescribed ratio. Therefore, the substances and soup liquid ladled up at a certain ratio can be sub-divided into platewares from the soup in the vessel.

Meanwhile, in the above described conventional soup supplying apparatus, when the soup accommodated in the vessel is sub-divided into the plateware, the ladle ladles up the soup in the vessel along the arc-shaped bottom wall of the vessel and leans in a state stopped at a prescribed position slightly protruding from the upper end of the vessel. Thus, the soup in the ladle is poured into the plateware. Therefore, when the ladle ladles up the soup past the upper end of the vessel, as the case may be, the soup pushed aside by the ladle in the vessel climbs over the upper end to spill outside the vessel, thereby soiling the apparatus. Further, the ladle leans in the neighborhood of the upper end of the vessel to pour the soup from the ladle-out mouth into the plateware. Therefore, the soup poured out may splash to soil the vessel.

SUMMARY OF THE INVENTION

The present invention has been made to solve the above problems, and therefore one of objects of the present invention is to provide a soup supplying apparatus which when a soup is ladled up by a ladle past the upper end of a vessel, can prevent the soup pushed aside by the ladle from climbing over the upper end of the vessel to spill; when the soup ladled up by the ladle is poured into a plateware, can prevent the soup from splashing to soil the outer wall of the vessel; and can make it difficult for the soup accommodated in the vessel to burn and stick onto the wall of the vessel so that when the vessel is washed, it can be easily washed clean.

According to one aspect of the invention, there is provided a soup supplying apparatus including: a vessel having an opening and accommodates a soup therein; a funnel member arranged within the vessel and rotatively moves out of the vessel through the opening; a ladling member that ladles up the soup accommodated in the vessel; a linkage mechanism provided with the ladling member at one end thereof; a linkage supporting portion that rotatably supports the linkage mechanism within the vessel; and a driving device that rotatively moves the linkage mechanism, wherein the ladling member is configured to be inserted into an inlet of the funnel member, when the driving device rotatively moves the linkage mechanism and the ladling member approaches the opening of the vessel, and to be rotatively moved out from the vessel together with the funnel member to supply the soup ladled by the ladling member into a plateware from an outlet of the funnel member, when the driving device further rotatively moves the linkage mechanism.

BRIEF DESCRIPTION OF THE DRAWINGS

The above and other objects and advantages of the present invention will become more fully apparent from the following detailed description taken with the accompanying drawings, in which:

FIGS. 5A–5D are side sectional views showing in order the operating states of a linkage mechanism within a vessel, a ladle, and a hopper, when the soup accommodated in the vessel is sub-divided into a plateware in the soup supplying apparatus according to the embodiment of this invention, wherein FIG. 5A shows a state when the linkage mechanism in the vessel has rotatively moved to a predetermined position opposite to the hopper, FIG. 5B shows a state where the linkage mechanism in the vessel rotatively moves toward the hopper so that the ladle is guided by the inner wall of an inlet of the hopper, FIG. 5C shows a state when the linkage mechanism further rotatively moves so that the ladle has been inserted into the hopper, FIG. 5D shows a state when the ladle being inserted in the hopper rotatively moves over the opening of the vessel to the outside thereof so that the soup in the ladle is poured into a plateware from an outlet of the hopper.

DETAILED DESCRIPTION OF THE PREFERRED EMBODIMENTS

Referring now to the accompanying drawings, a description will be given in detail of a preferred embodiment of the invention.

Figure 1:
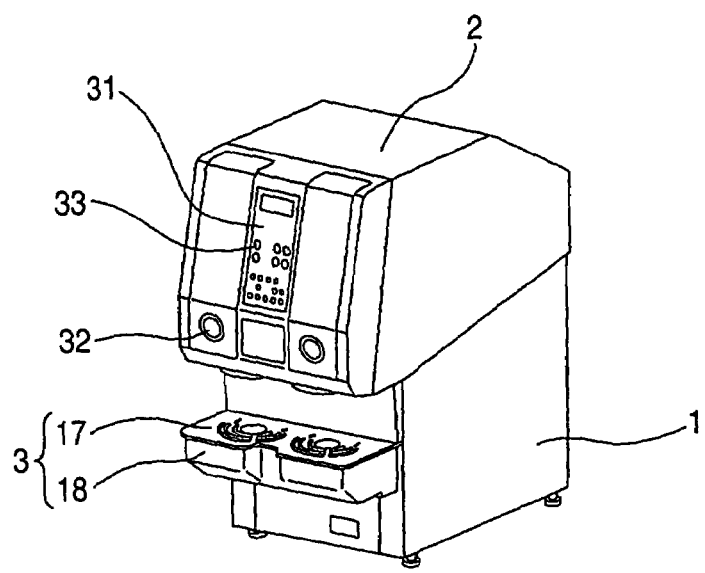
FIG. 1 is an appearance perspective view showing a soup supplying apparatus according to an embodiment of the present invention.
Figure 2:
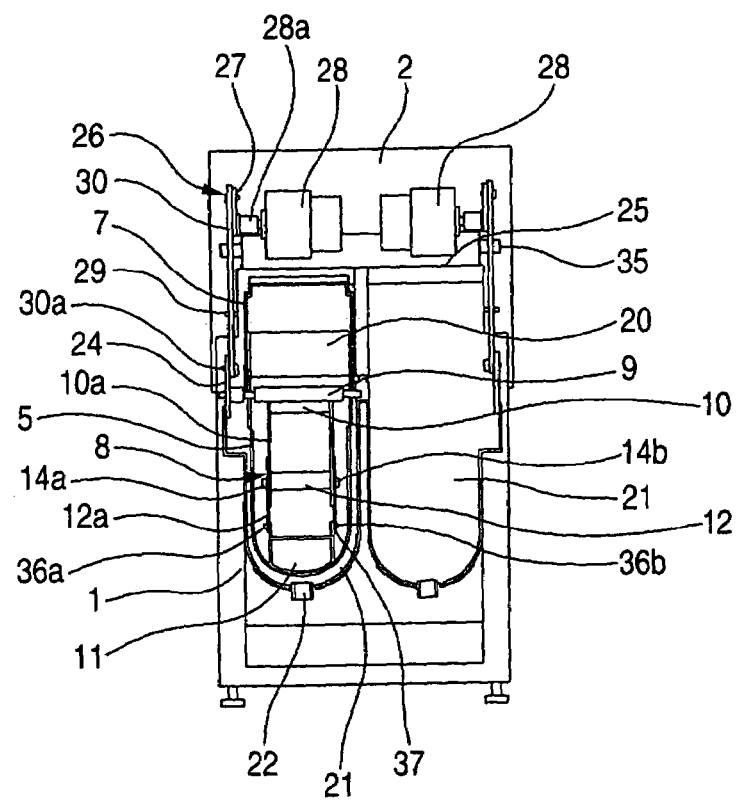
FIG. 2 is a front sectional view showing an internal structure of the soup supplying apparatus according to the embodiment.
Figure 3:
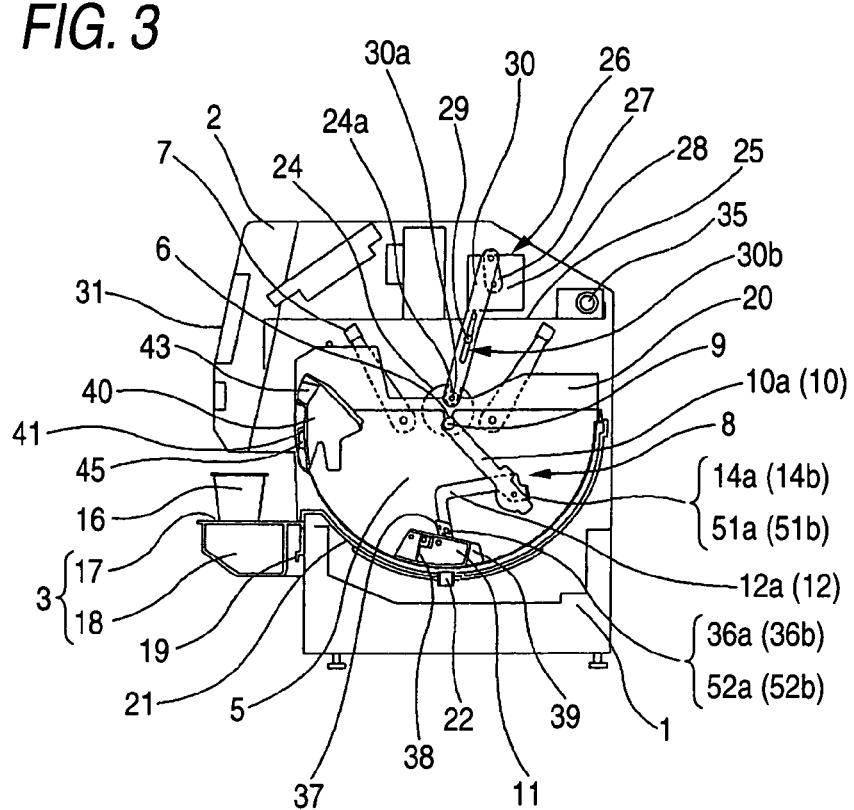
FIG. 3 is a front sectional view showing the internal structure of the soup supplying apparatus according to the embodiment.
Figure 4:
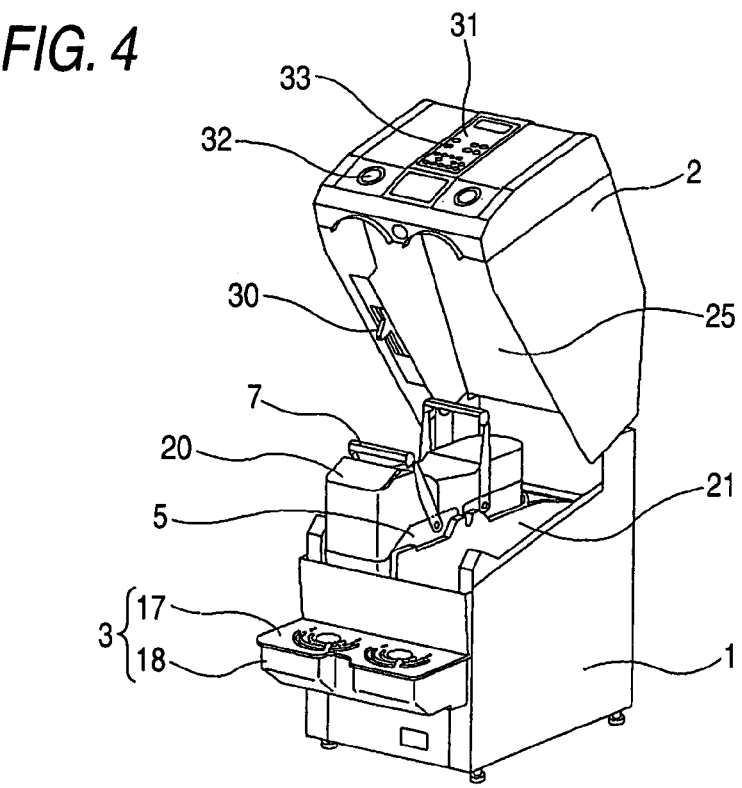
FIG. 4 is a perspective view of the soup supplying apparatus according to the embodiment when an upper cover covering the opening of an upper portion of an apparatus body has been rotated upward to open.

FIG. 1 is an appearance perspective view showing a soup supplying apparatus according to an embodiment of the present invention. FIG. 2 is a front sectional view showing an internal structure of the soup supplying apparatus according to the embodiment. FIG. 3 is a front sectional view showing the internal structure of the soup supplying apparatus according to the embodiment. FIG. 4 is a perspective view of the soup supplying apparatus according to the embodiment when an upper cover covering the opening of an upper portion of an apparatus body has been rotated upward to open.

Figure 5A:
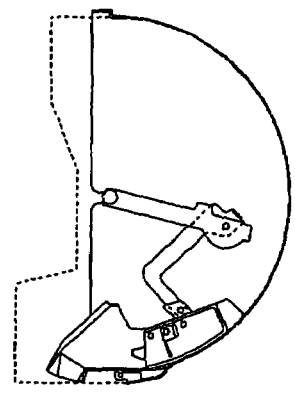
Figure 5B:
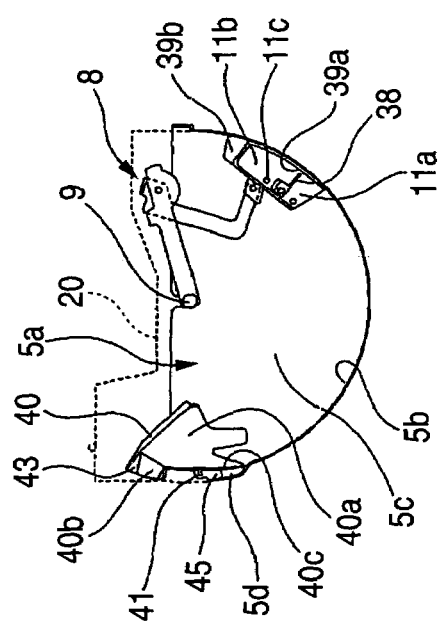
Figure 5C:
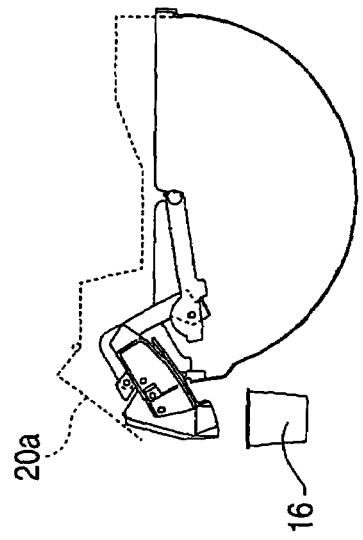
Figure 5D:
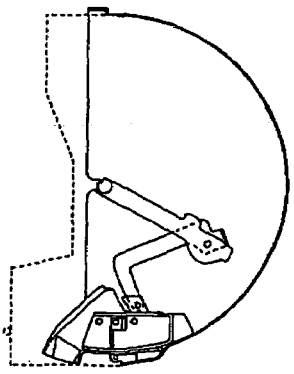

FIGS. 5A–5D are side sectional views showing in order the operating states of a linkage mechanism within a vessel, a ladle, and a hopper, when the soup accommodated in the vessel is sub-divided into a plateware in the soup supplying apparatus according to the embodiment of this invention, wherein FIG. 5A shows a state when the linkage mechanism in the vessel has rotatively moved to a predetermined position opposite to the hopper, FIG. 5B shows a state where the linkage mechanism in the vessel rotatively moves toward the hopper so that the ladle is guided by the inner wall of an inlet of the hopper, FIG. 5C shows a state when the linkage mechanism further rotatively moves so that the ladle has been inserted into the hopper, FIG. 5D shows a state when the ladle being inserted in the hopper rotatively moves over the opening of the vessel to the outside thereof so that the soup in the ladle is poured into a plateware from an outlet of the hopper.

As seen from FIGS. 1–4, the soup supplying apparatus includes an apparatus body 1 for holding a vessel 5 accommodating a soup, an upper cap 2 openably covering the upper part of the body 1 and plateware placing portions 3 each located in front of the body 1 where a plateware 16 into which the soup is sub-divided is placed.

The apparatus body 1 includes two vessel holding portions 21 each for holding a vessel 5 accommodating the soup. The vessel holding portion 5 is, on its bottom, provided with a heating device 22 for heating and keeping warm the soup accommodated in the vessel 5.

The upper cap 2 includes a cover 25 for covering the upper portion of the vessel 5 held in the vessel holding portion 21; a driving device 26 arranged on the cover 25, which includes a driving motor 28 for driving a ladle 11 for ladling the soup in the vessel 5; and a control panel 31 arranged to orient forward in front of the driving device 26 and provided with sub-division switches 32 each for starting the sub-division operation of the soup and setting buttons 33 for setting a soup warm-keeping temperature and others. The upper cap 2 is rotatably vertically linked with the apparatus body 1 by a supporting shaft 35 located at the rear. By rotating upward the upper cap 2 to open the upper part of the apparatus body 1 (see FIG. 4), the vessel 5 accommodating the soup can be easily attached to or detached from the vessel holding portion 21 of the apparatus body 1.

The plateware placing portion 3 has a placing stand 17 on which the plateware 16 is placed, and a soup recovering bucket 18 which serves to recover and accumulate the soup spilled when the soup is sub-divided into the plateware 16. The plateware 3 is detachably locked to the front of the apparatus body 1 by a hook 19.

The vessel 5 that accommodates the soup 5 is formed in a semi-circular shape when viewed from the side. A bottom 5b is formed along the arc portion and an opening 5a is formed at the chord. At the upper end of the bottom 5b, an expanded portion 5d facing the opening 5a and warping outward from the arc portion is formed. A hopper 40 is internally journaled on the expanded portion 5d. The hopper 40 into which the ladle 11 is inserted rotates outward through an opening 5a. The bottom 5b is formed as a semi-circular curve with the center dished outwardly. Side portions 5c are formed on both left and right sides of the bottom. Provided at the side portions 5c are a U-shape groove 6 (linkage portion supporting portion) in which the linkage mechanism 8 is detachably supported and grips 7 for carrying the vessel 5. By designing the vessel 5 in such a manner, where the soup is accommodated within the vessel 5, the soup can be easily accumulated to the center of the bottom 5b of the vessel 5. The vessel 5 is provided, at its upper portion, with a vessel cover 20 covering the opening 5a.

The linkage mechanism 8 arranged in the vessel 5 includes an axis 9, a rotary arm member 10 composed of a pair of square pieces 10a provided perpendicular to the axis 9 and a ⊃-shape swing arm member 12 which is journaled to the tip of the rotary arm member 10 and a ladle 11 which is rotatably supported or journaled to the open end of the swing arm member 12.

At the tip of the pair of square pieces 10a which are provided on the axis 9 to constitute the rotary arm member 10, locking pins 14a, 14b are protruded outwardly for journaling the swing arm member 12. The swing arm member 12, in the vicinity of the base of a pair of tongue pieces 12a bent in parallel, is provided with opposite pin holes 51a, 51b in which the locking pins 14a, 14b are to be fit, respectively. At the tip of the swing arm member 12, coupling holes 52a, 52b are formed for coupling the ladle 11 with the swing arm member 12. Coupling pins 36a, 36b which are located above the ladle and to be fit in the coupling holes 52a, 52b of the swing arm member 12 are protrusively provided on a coupling plate 37.

The pair of square pieces 10a of the rotary arm member 10 are formed of flat springs having elasticity so that the interval between their tips can be shortening. Likewise, the pair of tongue pieces 12a of the swing arm member 12 are formed of flat springs having elasticity so that the interval between their tips can be lengthened. By shortening the interval between the tips of the pair of square pieces 10a of the rotary arm member 10, the swing arm member 12 coupled with the tips can be easily attached or detached. Likewise, by lengthening the interval between the tips of the pair of tongue pieces 12a of the swing arm member 12, the ladle 11 coupled with the tips can be easily attached or detached. In short, the linkage mechanism can be easily dismantled into its respective components.

The linkage mechanism 8 is journaled, in its both ends of the axis 9, by the U-shaped grooves 6 formed on both sides 5c, and hence can be freely rotatively moved in the vessel. The ladle 11 provided at the tip of the linkage mechanism 8 is adapted so that the distance from the axis 9 can be varied by the linkage structure including the rotary arm member 10 and the swing arm member 12. Hence, the bottom of the ladle 11 can rotatively move along the bottom the vessel 5.

At the one end of the axis 9, a plate-like coupling plate 24 is provided which is coupled with the driving device 26 arranged in the upper cap 2 to rotate the linkage mechanism 8 back and forth. The coupling plate 24 has a groove 24a to be engaged with a driving coupling pin 30a of the driving device 26 described later.

The ladle 11 is formed in a sack shape with an opening 11a at the one end. The ladle 11 has an soup accommodating section 11b for ladling the soup in the inside thereof. The soup accommodating section 11b also has a partitioning net 38 which partitions itself into a front side and a rear side.

The ladle 11 is provided, on the bottom, with a scraper (scraping member) 39 that scrapes the bottom 5b of the vessel 5.

The scraper 39 is designed so that its bottom 39a extends along the bottom 5b of the vessel 5. When the linkage mechanism 8 rotatively moves within the vessel 5, the scraper 39 slides over the bottom 5b while its bottom is in wide contact with the bottom 5b of the vessel 5. This prevents burning/sticking of the soup accommodated in the vessel 5 onto the bottom 5b. The rear 39b of the scraper 39 is formed so that it covers the rear of the ladle 1 to be sharp rearwards. So, when the ladle 11 rotatively moves rearward in the direction opposite to the opening 11a, it can rotatively move with less resistance to the soup accommodated in the vessel 5.

The partition net 38 has a net adjusted so that it does not pass the substances contained in the soup and passes only the soup liquid. The ladle 11 has a plurality of net fitting portions 11c where the partition net 38 is fit so that the partitioning position where the soup accommodating section 11b is partitioned can be changed. This allows the ratio between the substances and soup liquid in the soup accommodated in the soup accommodating portion in the ladle 11 to be constant, and also the ratio to be changed by changing the portioning position of the partition net 38 as required.

The ladle 11 configured in this manner is journaled on the tip of the linkage mechanism 8 so that its opening 11a can be rotatively moved toward the hopper 40 provided at the expanded portion 5d of the vessel 5.

The hopper 40 is rotatably supported or journaled on a hopper supporting member 45 provided at the expanded portion 5d of the vessel 5 by a supporting shaft 41. The hopper includes an inlet 40 into which the ladle 11 is inserted and an outlet 40b from which the soup is poured into the plateware 16. The inlet 40a is formed so that the inner wall 40c of the hopper 40 becomes in plane with the arc-shaped bottom 5b of the vessel 5 when the ladle 11 is inserted into the inlet 40a. The hopper 40 is provided with a detachable (replaceable) nozzle 43 constituting the outlet 40b.

The driving device 26 provided on the upper cap 2 includes a driving motor 28, an driving arm 27 secured to the axis 28a of the driving motor 28, a driving linkage piece 30 with one end journaled on the tip of the driving arm 27, a guiding shaft 29 engaged in a long slot 30b provided longitudinally along the driving linkage piece 30 and a driving coupling pin 30a engaged in a groove 24a formed on the coupling plate 24 of the linkage mechanism 8 provided at the other end of the driving linkage piece 30. In the driving device 26 thus configured, when the driving motor 28 is energized, the driving arm 27 rotates with the axis 28a so that the driving linkage piece 30 journaled on the tip of the driving arm 27 swings while being guided by the guiding shaft 29 engaged in the long slot 30b. Further, by the driving coupling pin 30a provided at the other end of the driving linkage piece 30, the coupling plate 24 of the linkage mechanism 8, engaged therewith is rotatively moved around the axis 9 so that the linkage mechanism 8 is rotatively moved. In this way, the linkage mechanism 8 is rotatively moved by the rotation of the driving motor 28.

In the soup supplying apparatus configured as described hitherto, an explanation will be given of the functions and operations of the respective components where the soup accommodated in the vessel 5 is sub-divided into the plateware 16.

First, taking the quantity of the substances contained in the soup into consideration, the ratio between the substances and soup liquid to be ladled up by the ladle 11 is determined. According to the ratio, the partition net 38 is fit in one of net fitting portions 11c provided at a plurality of positions. Next, the linkage mechanism 8 with the ladle 11 mounted is put in the vessel 5 so that the axis 9 of the linkage mechanism 8 is attached to the U-shaped grooves 6 provided on the sides 5 of the vessel 5c. The soup is poured into the vessel 5 and accommodated therein.

Subsequently, as seen from FIG. 4, the upper cap 2 which closes the upper opening of the apparatus body 1 is rotatively moved upwards to open. With the grips 7 of the vessel 5 being gripped, the vessel 5 is mounted in the vessel holding portion 21 of the apparatus body 1. Next, the upper cap 2 is rotatively moved downwards to close the upper part of the apparatus body 1. At this time, the driving coupling pin 30a of the driving device 26 provided in the upper cap 2 is engaged in the groove 24a provided in the coupling plate 24 of the linkage mechanism 8. The keeping temperature of the soup is set by the setting button 33 on the control panel 31. In this status, the soup accommodated in the vessel 5 is kept at a predetermined temperature.

Further, in this state, the soup accommodated in the vessel 5 is stirred by the ladle 11 of the linkage mechanism 8. Concretely, when the driving motor 28 of the driving device 26 provided in the upper cap 2 is energized, the link driving mechanism 8 and the ladle 11 at its tip are rotatively moved in one direction by the driving linkage piece 30. When they are rotatively moved to a prescribed position (e.g. position inclined by 60 degrees backward), the ladle 11 as well as the linkage mechanism 8 is rotatively moved in the other direction opposite to the one direction. Likewise, when they are rotatively moved to a prescribed position (e.g. position inclined by 60 degrees forward), the ladle 11 as well as the linkage mechanism 8 is rotatively moved in the one direction. Such an operation is repeated successively or intermittently. Thus, the soup accommodated in the vessel 5 is stirred by the ladle 11. Further, simultaneously, the scraper 39 provided on the bottom of the ladle 11 slides over the bottom 5b of the vessel 5 in wide contact therewith so that the soup is prevented from burning and sticking onto the bottom 5b of the vessel.

Now when the plateware 16 is placed on the plateware placing portion 3 and a sub-division starting switch 32 on the control panel 31 is operated, the sub-division operation of the soup is started. Concretely, when the driving motor 28 of the driving apparatus 26 is energized, the linkage mechanism 8 is rotated through the driving linkage piece 30 in a direction opposite to the opening 11a of the ladle 11 from a stand-by status as shown in FIG. 3. As seen from FIG. 5A, when the linkage mechanism 8 is rotatively moved to a predetermined position (e.g. position inclined by 45 degrees backward), it starts to rotate in the direction of the opening 11a of the ladle 11. At this time, the ladle 11 makes an arc movement along the bottom 5b of the vessel 5 in sliding-contact therewith so as to accommodate the soup in the soup accommodating potion 11b from the opening 11a. Thus, the soup is accommodated in the soup accommodating section 11b at a predetermined ratio between the substances and soup liquid set by the partition net 38.

When the rotation further proceeds, as seen from FIG. 5B, the ladle 11 is guided from the arc-shaped bottom 5b of the vessel 5 along the inner wall 40c of the inlet 40a of the hopper 40 which is formed to lead to the bottom 5b. The ladle 11 is eventually inserted into the inlet 40a of the hopper 40.

When the linkage mechanism 8 further rotatively moves, the ladle 11, while being inserted in the hopper 40 and integral thereto, around the supporting shaft 41 journaling the hopper 40, rotatively moves over the opening 5b of the vessel 5 to the outside thereof as seen from FIG. 5B. Thus, the soup in the ladle 11 is poured into the plateware 16 placed on the plateware placing portion 3. In this case, the soup accommodated within the soup accommodating section 11b is poured into the plateware 16 in a nearly constant state through the hopper 40 from its outlet 40b. When the whole soup accommodated in the soup accommodating section 11b has been sub-divided into the plateware 16, the linkage mechanism 8 is rotated in an opposite direction so that the ladle 11 is returned into the vessel 5 again. Such an operation is repeated as required so that predetermined quantities of soup are sub-divided into the platewares 16.

Incidentally, the vessel cover 20 covering the opening 5a of the vessel 5 is normally closed and is provided with a pouring mouth door 20a which is opened owing to pushing force resulting when the ladle 11, while being inserted in the hopper 40 and integral thereto, rotatively moves over the opening 5b of the vessel 5 to the outside thereof.

Thus, where the soup in the vessel 5 is ladled up by the ladle 11 and poured into the plateware 16, the soup ladled up in the ladle 11 is poured into the plateware 16 in a nearly constant state through the hopper 40 from its outlet 40b. This prevents the soup poured from splashing or scattering. Further, the ladle 11, while being inserted in the hopper 40, rotatively moves the outside of the vessel 5. This prevents the soup from dripping from the end of the opening 11a of the ladle 11 to the outside of the vessel 5. The apparatus, therefore, can be kept clean.

Further, since the hopper 40 is provided with the detachable (replaceable) nozzle 43 constituting the outlet 40b, by replacing the nozzle 43, the size and shape of the outlet 40b of the hopper 40 can be easily changed. Specifically, even when the kind or density of the soup accommodated in the vessel 5 is changed, by mounting the nozzle 43, having the outlet 40b formed with the size and shape suitable to the pertinent soup, in the hopper 40, the pouring state of the soup can be controlled so that the soup poured from the outlet 40b of the hopper 40 does not splash nor scatter.

When the ladle 11 that rotatively moves along the arc-shaped bottom 5b of the vessel 5 is inserted into the hopper 40 provided at the expanded portion 5d of the vessel 5, the ladle 11 is guided by the inner wall 40c of the inlet 40a of the hopper 40 which is formed to lead to the arc-shaped bottom 5b. For this reason, the ladle 11 can be smoothly inserted into the hopper 40. Accordingly, when the ladle 11, while ladling the soup in the vessel 5 approaches the hopper 40, the soup thus pushed aside is once carried in the hopper 40 and hence does not spill over the end of the opening 5a of the vessel 5 to the outside thereof.

Further, since the scraper 39 provided on the bottom of the ladle 11 slides over the bottom 5b in wide contact with the bottom 5b of the vessel 5, the burning (or sticking) of the soup onto the bottom 5b of the vessel 5 can be prevented. Thus, when the vessel 5 is washed, it can be easily made clean.

The arc-shaped bottom 5b of the vessel 5 is formed as a semi-circular curve with the center dished outwardly. Side portions 5c are formed on both left and right sides of the bottom. In the vessel 5 designed in this manner, when the quantity of the soup accommodated in the vessel 5 becomes little, the soup can be accumulated at the center of the bottom 5b of the vessel 5. This allows the soup to be effectively ladled up by the ladle 11. Thus, insufficient ladling of the soup can be avoided to prevent its sticking to the vessel 5. Accordingly, the apparatus can be kept clean and the vessel can be easily washed clean. In this way, the soup supplying apparatus according to the embodiment, where the soup in the vessel 5 is sub-divided into the plateware, can prevent the respective components of the apparatus from being soiled by the soup, and even where the apparatus has been soiled, allows these components to be easily washed clean.

Incidentally, it is needless to say that this invention should not be limited to the apparatus given by the embodiment and can be modified within a scope including the intention of this invention.

As described above, the soup supplying apparatus includes: a vessel having an opening for accommodating a soup; a funnel member arranged within the vessel and rotatively moving to the outside of the vessel through the opening; a ladling member for ladling up the soup within the vessel; a linkage mechanism provided with the ladling member at its one end; a linkage supporting portion for rotatably supporting the linkage mechanism within the vessel; and a driving device for rotatively moving the linkage mechanism, wherein when the linkage mechanism supported within the vessel is rotatively moved by the driving device and the ladling member provided at its end approaches the opening of the vessel, the ladling member is inserted into an inlet of the funnel member, the funnel member as well as the ladling member is rotatively moved past the opening to the outside of the vessel, and the soup ladled up by the ladling member is sub-divided into a plateware from an outlet of the funnel member.

According to this configuration, where the soup ladled up by the ladling member poured is into the plateware, the soup is poured out through the hopper from its cylindrical slot. For this reason, the pouring state can be kept nearly constant. Further, since the ladling member is inserted in the funnel member, the soup can be prevented from dripping from the ladling member to the outside of the vessel.

In the soup supplying apparatus, the funnel member is provided with an outlet changing member which can change the size and shape of the outlet. According to this configuration, according to the size of substances or density of the soup liquid of the soup accommodated in the vessel, the size or shape of the cylindrical slot of the funnel member can be changed.

In the soup supplying apparatus, the vessel includes an bottom in an arc shape with its upper portion opened, and an expanded portion formed at the upper end of the bottom to face the opening and being expanded outward from the arc shape; the linkage supporting portion arranges an axis of the linkage mechanism concentrically with the arc shape to rotatably support the ladling member along the bottom in the arc shape; and the funnel member is arranged at the expanded portion so that an inner wall of the inlet leads to the bottom in the arc shape. According to this configuration, the inner wall of the inlet of the funnel member provided at the expanded portion guides the ladling member rotatively moving along the bottom so that the ladling member can be smoothly inserted into the funnel member.

In the soup supplying apparatus, the ladling member is provided with a scraping member in contact with the bottom of the vessel. According to this configuration, when the soup is accommodated in the vessel, the burning (or sticking) of the soup onto the bottom can be prevented.

In the soup supplying apparatus, the bottom of the vessel is formed to link both side plates of the vessel by a curve with a curved surface that a central portion thereof being expanded outwardly. According to this configuration, when the quantity of the soup accommodated in the vessel becomes little, the soup is accumulated at the center of the bottom so that it can effectively ladled up by the ladling member.

As described hitherto, according to the soup supplying apparatus, where the soup ladled up by the ladling member is poured into the plateware, the soup is poured out through the funnel member from its cylindrical slot so that the pouring state can be kept nearly constant. This prevents the soup poured through the funnel member from splashing or scattering to be applied to the vessel and apparatus components in the vicinity thereof, thereby keeping the apparatus clean. Further, since the ladling member is inserted in the funnel member, the soup can be prevented from dripping from the ladlingmember to the outside of the vessel. So, the apparatus, likewise, can be kept clean.

According to the soup supplying apparatus, according to the size of substances or density of the soup liquid of the soup accommodated in the vessel, the size or shape of the cylindrical slot of the funnel member can be changed. Therefore, even when the kind or density of the soup is changed, the pouring state of the soup can be controlled so that the soup poured from the outlet of the funnel member does not splash nor scatter.

According to the soup supplying apparatus, the inner wall of the inlet of the funnel member provided at the expanded portion guides the ladling member rotatively moving along the bottom so that the ladling member can be smoothly inserted into the funnel member. For this reason, when the ladling member, while ladling the soup in the vessel, approaches the funnel member, the soup thus pushed aside does not spill over and outside the end of the opening of the vessel.

According to the soup supplying apparatus, when the soup is accommodated in the vessel, the burning (or sticking) of the soup onto the bottom can be prevented. So the vessel can be easily washed clean.

According to the soup supplying apparatus, when the quantity of the soup accommodated in the vessel becomes little, the soup is accumulated at the center of the bottom so that it can effectively ladled up by the ladling member. Thus, insufficient ladling of the soup can be avoided and the apparatus can be kept clean.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A soup supplying apparatus comprising:
   a vessel having an opening and accommodates a soup therein;
   a funnel member arranged within the vessel and rotatively moves out of the vessel through the opening;
   a ladling member that ladles up the soup accommodated in the vessel;
   a linkage mechanism provided with the ladling member at one end thereof;
   a linkage supporting portion that rotatably supports the linkage mechanism within the vessel; and
   a driving device that rotatively moves the linkage mechanism,
   wherein the ladling member is configured to be inserted into an inlet of the funnel member, when the driving device rotatively moves the linkage mechanism and the ladling member approaches the opening of the vessel, and to be rotatively moved out from the vessel together with the funnel member to supply the soup ladled by the ladling member into a plateware from an outlet of the funnel member, when the driving device further rotatively moves the linkage mechanism.

2. The soup supplying apparatus according to claim 1, wherein the funnel member is provided with an outlet changing member that is replaceable to change a size and shape of the outlet.

3. The soup supplying apparatus according to claim 1, wherein a bottom of the vessel is formed in an arc shape,
   wherein the vessel includes an expanded portion formed at a portion adjacent to an upper end of the bottom and being expanded outward from the arc shape,
   wherein the linkage supporting portion supports the linkage mechanism at an axis of the linkage mechanism being arranged concentric with the arc shape to allow the ladling member to rotate along the bottom in the arc shape, and
   wherein the funnel member is arranged at the expanded portion so that an inner wall of the inlet becomes in plane with the bottom in the arc shape.

4. The soup supplying apparatus according to claim 3, wherein the ladling member is provided with a scraping member that scrapes the bottom of the vessel.

5. The soup supplying apparatus according to claim 3, wherein the bottom of the vessel is formed to link both side plates of the vessel with a curved surface that a central portion thereof being expanded outwardly.

* * * * *